(12) United States Patent
Townsend et al.

(10) Patent No.: US 8,048,507 B2
(45) Date of Patent: Nov. 1, 2011

(54) TEMPORARY SURFACE PROTECTION (75) Inventors: David Blaire Townsend, Manchester, NH (US); William H. Shepard, Amherst, NH (US); Scott Billings, Shirley, MA (US)

(73) Assignee: Velcro Industries B.V., Curacao ( * ) Notice: Subject to any disclaimer, the term of this patent is extended or adjusted under 35 U.S.C. 154(b) by 0 days.

(21) Appl. No.: 13/016,513

(22) Filed: Jan. 28, 2011

(65) Prior Publication Data

US 2011/0189423 A1 Aug. 4, 2011

Related U.S. Application Data (60) Provisional application No. 61/299,848, filed on Jan. 29, 2010.

(51) Int. Cl.
*A44B 18/00* (2006.01)
*B32B 25/00* (2006.01)

(52) U.S. Cl. ............. 428/100; 24/442; 24/452; 428/95; 428/99

(58) Field of Classification Search .............. 428/95, 428/99, 100; 24/442, 452
See application file for complete search history.

(56) References Cited

FOREIGN PATENT DOCUMENTS

| DE | 76 32 526 U1 | 1/1977 |
| WO | 96/41716 A1 | 12/1996 |
| WO | 01/81771 A2 | 11/2001 |

OTHER PUBLICATIONS

Authorized Officer Lorraine Duffy, International Search Report and the Written Opinion for Application No. PCT/US2011/022833, Apr. 20, 2011, 9 pages.

*Primary Examiner* — Brent O'Hern
(74) *Attorney, Agent, or Firm* — Fish & Richardson P.C.

(57) ABSTRACT

A carpeted surface is protected with a temporary carpet protection sheet that includes a lightweight non-woven or knit fibrous material laminated with a resin backing into which at least portions of fibers of the fibrous material are embedded, or to which resin of the fibers is directly and chemically fused. Male touch fastener elements extend along the backing and are arranged in spaced apart fastening regions adjacent the longitudinal edges of the fibrous material. The male touch fastener elements are configured to be both releasably engageable with the hook-engageable fibers of the fibrous material, when the protection sheet is arranged in overlapping fashion, and releasably engageable with looped carpet tufts. A protection system features multiple lengths of such protection sheet joined by hook seaming tape.

27 Claims, 9 Drawing Sheets

TEMPORARY SURFACE PROTECTION

CROSS-REFERENCE TO RELATED APPLICATIONS

Under 35 U.S.C. §119, this application claims benefit of U.S. Provisional Application Ser. No. 61/299,848, filed Jan. 29, 2010, the entire contents of which are hereby incorporated by reference.

TECHNICAL FIELD

This invention relates to temporarily protecting carpet or fabric-covered surfaces with a removable protection sheet that releasably attaches to the carpet or fabric-covered surface, and to products configured for such uses.

BACKGROUND

Carpet can be easily damaged by excess traffic or sliding or rolling loads, and it is often desired to protect carpeting from damage and even from normal wear, soil, spills or stains. This is particularly true in the construction trades, where carpet is often installed before the overall construction is completed. Carpet may also need to be protected during renovations, or during high traffic or loading events. It may also be desirable to provide a temporary surface over existing carpet simply to present a different visual effect, such as for aesthetic appeal or to provide information.

One of the more commonly employed carpet protection products is a sheet of adhesive film that is rolled out over a carpeted surface. The surface of the film is provided with a pressure-sensitive adhesive, which bonds to the carpet fibers and holds the sheet in place. Other ways that carpet is temporarily protected include covering the carpet with cardboard, paper or tarps, for example, and taping down the edges of the covering to the carpet.

Improvements in such products and in other forms of surface protection are desired.

SUMMARY

One aspect of the invention features a temporary fibrous surface protection sheet that includes a lightweight fibrous material, such as a non-woven or knit, having longitudinal edges spaced apart to define a width, such as of at least 0.5 meter, and an exposed broad surface featuring hook-engageable fibers, a resin backing into which at least portions of fibers of the fibrous material are embedded, or to which resin of the fibers is directly and chemically fused, on a surface of the fibrous material opposite the exposed broad surface, and male touch fastener elements extending along the backing and arranged in spaced apart fastening regions adjacent the longitudinal edges of the fibrous material. The male touch fastener elements are configured to be both releasably engageable with the hook-engageable fibers of the fibrous material, when the protection sheet is arranged in overlapping fashion, and releasably engageable with the fibrous surface to be protected, such as looped tufts of an installed carpet.

Another aspect of the invention features such a protection sheet in combination with a fibrous surface over which the protection sheet is temporarily secured, the male touch fastener elements configured to be releasably engageable with the fibrous surface.

In some examples the protection sheet is free of adhesives, the resin backing bonded directly to the fibrous material and the male touch fastener elements of each fastening region extending from a unitary, molded base resin layer bonded directly to the resin backing. In some cases, the male touch fastener elements of each fastening region form, together with the base resin layer of the region, a unitary, seamless resin mass. For example, the male touch fastener elements, the base resin layers and the resin backing may together form a unitary, seamless resin mass.

In some instances the fibrous material, resin backing and male touch fastener elements each comprise at least 85 percent polypropylene.

In some embodiments, each base resin layer is welded to the resin backing. For example, in some cases each base resin layer is welded to the resin backing only in weld areas spaced-apart across the base resin layer. For some applications, the weld areas of each base resin layer are spaced from adjacent longitudinal edges of the base resin layer, such that the longitudinal edges of the base resin layer remain detached from the resin backing layer.

In some instances, the weld areas of each base resin layer are longitudinally discontinuous along the base resin layer.

In some examples the protection sheet consists essentially of the fibrous material, the resin backing, the male touch fastener elements and the base resin layers.

Preferably, the protection sheet has an overall basis weight, averaged across its width, of less than about 65 grams per square meter (1.9 osy).

The male touch fastener elements are preferably configured to provide an initial Carpet Peel force of less than about 0.5 pounds per lineal inch (9.0 grams per lineal millimeter) of fastening region width, measured as we define below. Such a low peel force is understood to avoid excessive carpet damage upon removal. Preferably, the initial Carpet Peel force is between about 0.1 and 0.5 pounds per lineal inch (1.8 to 9 grams per lineal millimeter) of fastening region width.

In some examples, the fibrous material comprises a spunbond non-woven material.

For some applications, the fibrous material has a basis weight of less than about 1.0 osy (33.7 gsm).

Preferably, each fastening region has a width less than about five percent of the width of the fibrous material, and is spaced from an adjacent longitudinal edge of the fibrous material by a distance between about 5 and 10 millimeters.

In some examples, the resin backing defines micro-holes providing air permeability through the protector sheet, such as for providing breathability to allow for carpet and adhesive curing. Such micro-holes preferably define an average hole area of less than about 0.005 square millimeters, to avoid excessive liquid seepage through the backing under some conditions.

For some uses, the protection sheet is spooled into a roll, with the male touch fastener elements facing outward and releasably engaging the fibrous material of an overlying portion of the protection sheet.

The fibrous material may include at least portions of a graphic visible from the exposed broad surface.

The protection sheet preferably has a burst strength of at least about 170 kPa (25 psi), and a tear strength of at least about 120 grams force.

According to another aspect of the invention, a temporary carpet protection system features the temporary protection sheet described above, in discrete lengths placed end-to-end over a length of carpet, and strips of seaming tape each extending across adjacent ends of the discrete lengths of protection sheet. The seaming tape may consist essentially of a length of molded hook tape having a continuous resin base from which an array of molded male touch fastener elements extend. The male touch fastener elements of the seaming tape engage underlying portions of the ends of the discrete lengths of protection sheet, to cover and retain the ends in place over the carpet.

In some instances the male touch fastener elements of the seaming tape are of identical shape and size in comparison with the male touch fastener elements of the protection sheet.

The system may also include a further length of the temporary protection sheet, placed in lateral overlapping relation to one of the discrete lengths of temporary protection sheet, such that the male touch fastener elements of the further length of temporary protection sheet overlie and releasable engage the fibrous material of the overlapped discrete length of temporary protection sheet.

Another aspect of the invention provides a method of temporarily covering an area of installed carpet. The method includes providing the temporary carpet protection sheet described above, and placing the temporary carpet protection sheet over the area of installed carpet to be covered, such that the male touch fastener elements of the temporary carpet protection sheet attach to the installed carpet as the temporary carpet protection sheet is placed, thereby removably covering the area of installed carpet.

In some cases the protection sheet is provided in roll form, the protection sheet being placed by unrolling the protection sheet over the area of installed carpet, with the male touch fastener elements of the temporary carpet protection sheet detaching from adjacent windings of the sheet as the temporary carpet protection sheet is unrolled.

In some cases the method also includes cutting the temporary carpet protection sheet across its width to form a cut end. For some installations, the method also includes unrolling a second length of temporary carpet protection sheet beginning at the cut end, thereby forming an abutting seam. A strip of seaming tape may then be secured over the cut end and an adjacent end of the second length of temporary carpet protection sheet, the seaming tape having an array of male touch fastener elements that releasably engage the fibrous surface of the temporary carpet protection sheet at the abutting seam.

While protecting from foot and wheeled traffic, and from spills and other damage, the carpet protection sheets disclosed herein can help to avoid direct adhesive contact to carpet surfaces, helping to prevent residual adhesive left on the carpet upon removal of the protection sheet. Furthermore, air permeability provided at least by the hook-fiber connection between sheet and carpet, and preferably also through the sheet itself, can help prevent the trapping of moisture in the carpet and can allow newly installed carpet adhesives to cure properly. The sheets can be removed and/or repositioned without undue damage to carpet surfaces, and can even be customized with appropriate preprinted graphics.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
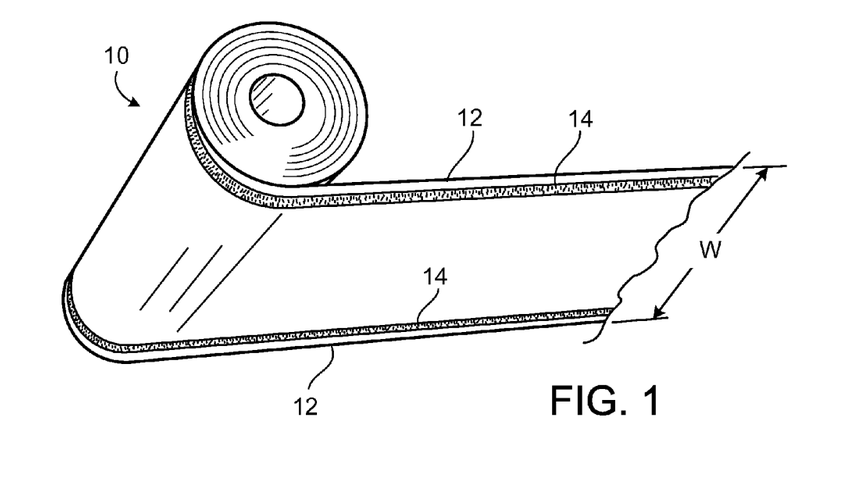
FIG. 1 is a perspective view of a partially unrolled spool of temporary carpet protection sheet.

FIG. 1 shows a temporary carpet protection sheet 10, in roll form, that can be unrolled over an area of carpet to temporarily protect the carpet, such as from wear or damage. Such a sheet can be employed, for example, during the final stages of construction, to protect recently installed carpeting from foot and equipment traffic. Such a sheet can also be temporarily engaged over existing carpet during renovation activities or when moving large or heavy items. Such a sheet can also be temporarily installed to protect carpeting during high-traffic events, such as parties or open houses.

As shown, sheet 10 is supplied in a continuous length, with longitudinal edges 12 defining an overall width 'W' of, for example, one meter. Other widths are envisioned. Particularly useful is a width 'W' chosen to essentially extend across a typical residential interior doorway, and/or larger than a track width of a typical moving dolly. Preferably, the width of the sheet is at least 0.5 meter. The overall length of the spooled sheet may be, for example, 30 meters.

Extending along the length of sheet 10, adjacent each longitudinal edge 12, are two bands of male touch fastener elements, each band defining a fastening region 14 of, for example, about 35 millimeters in width, spaced from an adjacent longitudinal edge 12 by a distance of about 6 millimeters. The roll of sheet 10 is configured with the fastener elements facing outward, such that when the sheet is unrolled over looped carpeting, the fastener elements releasably engage fibers of the carpet to hold the sheet in place. As rolled, the fastener elements releasably engage the fibrous upper surface of an overlying portion, or adjacent winding, of the protection sheet.

Figure 2:
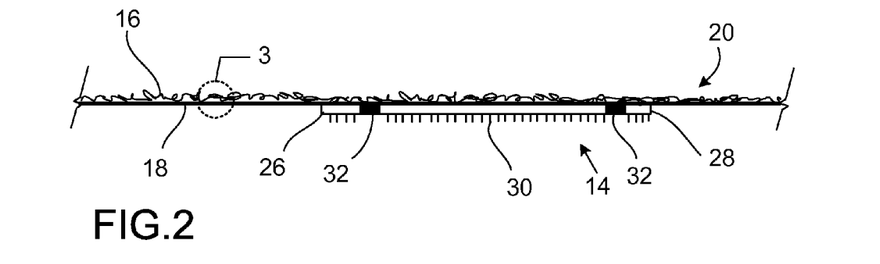
FIG. 2 is a partial cross-sectional view of an edge portion of the protection sheet, showing one fastener strip.
Figure 3:
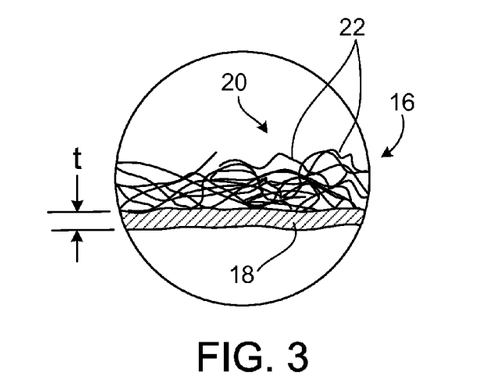
FIG. 3 is an enlarged view of area 3 of FIG. 2.

Referring now to FIGS. 2 and 3, the body of sheet 10 is made up of a laminate of a fibrous material 16 and a resin backing 18. Both the fibrous material 16 and the resin backing 18 extend across the width of sheet 10 and are continuous along its length. The fibrous material has an exposed broad surface 20 featuring hook-engageable fibers 22. Fibers 22 not only provide for hook engagement, they also present an aesthetically pleasing, non-shiny and non-slip fibrous surface that is also useful in retaining debris that would otherwise be tracked throughout a building. Portions of fibers of the opposite side of material 16 are at least partially embedded directly into resin of backing 18, thereby permanently bonding material 16 to backing 18, which is relatively thin compared to the overall thickness of the fibrous material. Resin backing 18 may have a thickness 't' of, for example, only about 0.025 millimeter. Alternatively, resin of the fibers and of the backing are directly and chemically fused at the interface between material 16 and backing 18. Preferably, no other materials, such as adhesives, are employed to bond the backing to the fibrous material. To this end, it can be advantageous to choose chemical bond-compatible materials for the fibrous material and the resin backing. For example, similar or identical resin types may be employed.

In one example, fibrous material 16 is a spun-bond polypropylene non-woven material, having a basis weight of about 30 grams per square meter (0.9 osy), with a fiber diameter of about 0.02 millimeter. Such a material is available, for example, from Polymer Group, Inc. of Charlotte, N.C. as an untreated SBPP product. In such an example resin backing 18 may be a polypropylene resin extruded onto the back surface of material 18 and calendered sufficiently to either cause the extruded polypropylene to flow around portions of the fibers of the material, such as to encapsulate them, or to cause resin of the fibers to at least partially melt and fuse to resin of the backing. Importantly, sufficient fibers on the exposed side of the material remain available to be engaged by hooks. In the example described above, the fibrous material is sufficiently thick and has sufficient thermal mass that the molten extrudate can be calendered onto the fibrous material at conditions that effect the desired bonding without eliminating the hook-engageability of the material. In one example, the 0.005 inch (0.13 mm) thick polypropylene extrudate film at about 580° F. (300° C.) enters a pressure nip between two rollers chilled to 65° F. (18° C.), along with the polypropylene spun-bond material described above. In the pressure nip the materials are pressed together with a gage pressure of about 12 psi (83 kPa). The molten resin fell about 0.3 meter from the extrusion die into the nip. The laminated materials were carried about one of the chilled rolls such that the material stayed in contact with the roll approximately 0.6 seconds following the nip, with a line speed of about 40 meters per minute. In another example, the film is about 0.025 inch (0.63 mm) thick.

Figure 4:
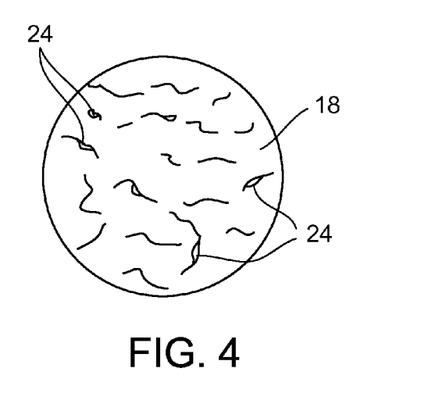
FIG. 4 is an enlarged view of the surface of the resin backing of the protection sheet, showing micro-holes.

In some cases, lamination of the resin backing 18 and fibrous material 16 results in the formation of micro-holes 24 through the resin backing, as shown in FIG. 4. Such holes enhance the breathability of the protection sheet, which enables adhesives of newly installed carpeting systems to properly cure, and allows for venting of volatile compounds from carpet system substances. These holes tend to form as a result of the lamination process when the resin backing is applied as a very thin film of extrudate onto a fibrous surface, and are another advantage of keeping the resin backing relatively thin. In one example, such holes were determined to have diameters or maximum lateral extents ranging from about 0.023 to about 0.078 millimeter. Preferably, these micro-holes have an average hole area, through the resin backing, of less than about 0.005 square millimeters. The micro-holes are preferably sufficiently small that the protection sheet provides reasonable protection of the underlying carpet from liquid spills, which tend to wick and spread across the fibrous surface of the sheet and thereby reduce the tendency for pooling or flow off of the edge of the sheet.

Air permeability of the laminate may be tested by known methods. Ideally, the laminate should allow any substantive air pressure differential to dissipate through the laminate over a reasonable length of time, certainly less than one minute.

Referring back to FIG. 2, fastening region 14 is provided by a strip 26 of molded hook fastener tape, welded directly to resin backing 18. In this example, strip 26 is molded of polypropylene and consists essentially of a continuous resin base layer 28 and an array of fastener elements 30 molded integrally with the base layer, such that the male touch fastener elements 30 of each fastening region form, together with the base resin layer 28 of the region, a unitary, seamless resin mass. In this example, base layer 28 is welded to resin backing 18 at two longitudinally continuous weld areas 32 spaced-apart across the base resin layer, strip 26 remaining otherwise unattached to the resin backing. Weld areas 32 are each about 1.6 millimeters wide, and are spaced from adjacent edges of strip 26 by a distance of about 3.2 millimeters, such that the strip edges are unattached and are available to function as anti-peel flaps in use, increasing the initial resistance to a peel force initiated from the longitudinal edge of the sheet while substantially unaffecting resistance to a peel force applied in the longitudinal direction of the sheet. The fastener elements 30 are arranged in an array extending across the entire width and length of strip 26, except in weld areas 32, in which the welding process eliminates the discrete fastener elements. The hook strips 26 may be thermally welded to backing 18 by known welding methods, such as by weld heads that slide along the areas to be welded as the laminate and hook strips pass over a drum sealer, with the heated weld heads directly engaging the fastening surface of the hook strips. As an alternative to welding, the hook strips may be formed in spaced-apart lanes directly on the laminate of the fibrous material and resin backing, such as by methods taught in U.S. Pat. No. 7,048,818 to Krantz et al., the entire contents of which are hereby incorporated by reference.

It is important that the fastener elements 30 are configured to be both releasably engageable with the hook-engageable fibers 22 of the fibrous material 16, when the protection sheet is arranged in overlapping fashion as in roll form or as installed over carpeting, and releasably engageable with looped carpet tufts. It is also important that the fastener elements 30 are configured to not unacceptably damage the carpet during removal of the protection sheet. Carpet damage can appear, for example, as excessive fuzziness caused by breakage of too many carpet fibers during disengagement of the fastener elements. Such damage is easy to obtain with fastener elements designed to aggressively retain high-tenacity loop fastener fibers, as carpet loop fibers are often of much lower tenacity and susceptible to breakage. While there are other fastener element designs that will work with some carpets, we have found that a particular fastener element design available from Velcro USA of Manchester, N.H., as '97 Hook' is particularly suitable for use with a wide range of carpet fibers, with acceptably minimal amounts of fuzziness resulting from disengagement. Details of the design and manufacture of such a hook is disclosed in U.S. Pat. No. 7,516,524, the entire contents of which are incorporated herein by reference.

Figure 5:
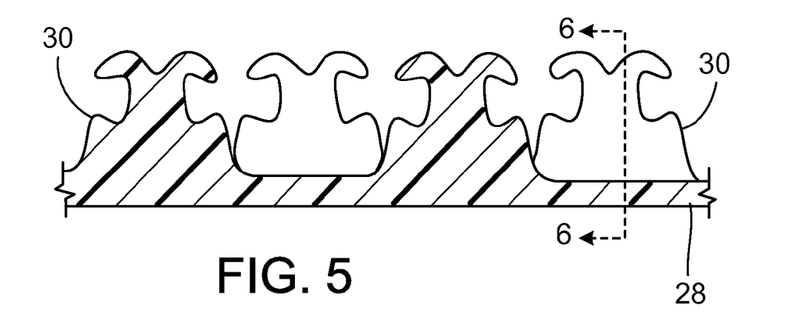
FIG. 5 is a partial cross-sectional view through an array of fastener elements.
Figure 6:
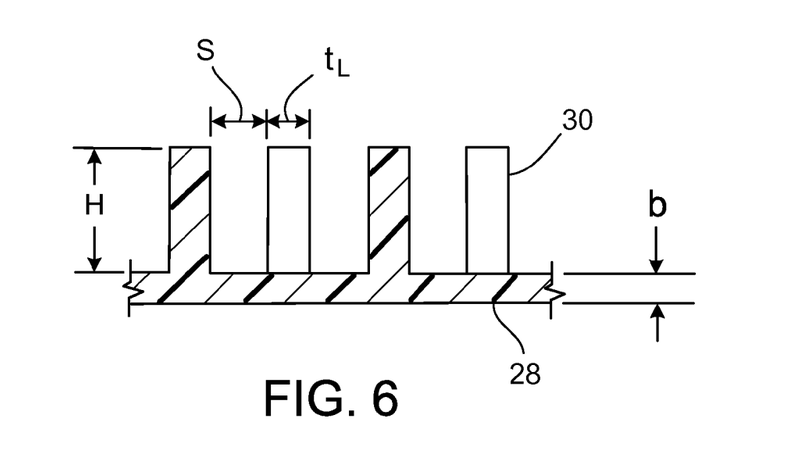
FIG. 6 is a cross-sectional view, taken along line 6-6 in FIG. 5.

FIGS. 5 and 6 illustrate an array of fastener elements 30, showing how the male touch fastener elements 30 form, together with the base resin layer 28 of the strip 26, a unitary, seamless resin mass. To give some perspective on the size of such fastener elements 30, they each have an overall height 'H' of about 0.31 millimeter and a lateral thickness $t_L$ of about 0.1 millimeter, with each longitudinal row of fastener elements spaced from an adjacent row by a distance 'S' of about 0.15 millimeter. The thickness 'b' of the base resin layer 28 is about 0.13 millimeter in this example, but can be as low as 0.03 millimeter. The fastener elements are arranged with a fastener element density of about 500 per square centimeter (3,200 per square inch), in longitudinally offset rows.

Figure 7:
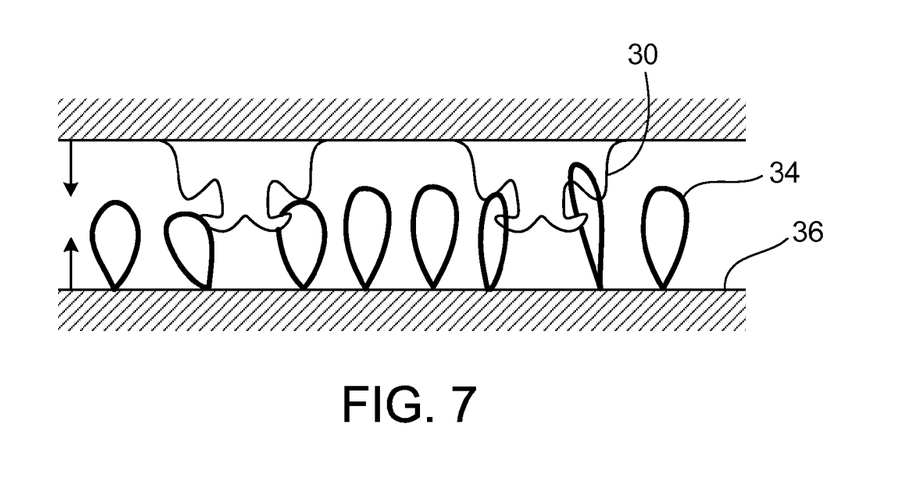
FIG. 7 is a schematic representation of fastener elements engaging carpet loops.

For avoiding excessive damage across a wide variety of loop carpet types, while providing acceptable engagement, the male touch fastener elements are preferably configured to provide an initial "Carpet Peel" force of between about 1.8 and 9.0 grams per lineal millimeter (0.1 to 0.5 pounds per lineal inch) of fastening region width. By "Carpet Peel" force, we mean peel force as determined in accordance with standard test method ASTM-D5170-98, as disengaged from a reference, pattern loop carpet material having the following specifications: a face weight of 881 grams per square meter (26.0 osy), a gauge of 39.37 per 10 centimeters, a finished pile thickness of 3.05 millimeters, a total thickness of 7.42 millimeters, a pattern repeat of 10.31 millimeters in width and 175.41 millimeters in length, loop pile fibers of nylon 6-6 having a fiber diameter of 0.075 millimeter (0.003 inch), arranged in loop tufts each having around 100 fibers, and a fiber tenacity of about 3 grams per denier. The loop tufts of the reference carpet material are formed by two yarns twisted together, each yarn having 50 filaments, the denier of the filaments being about 47 and the overall yarn denier being about 4700. Such a reference carpet product is available from the Shaw Industries Group as Constellation Teklok®. FIG. 7 schematically illustrates fastener elements 30 engaging loops 34 of a carpet 36. This figure is not to scale.

The break strength of the laminate can be determined in accordance with ASTM 5035. Preferably, the break strength in any lateral direction, when measured in accordance with that standard test method, is at least about 25 Newtons. The tear strength of the laminate can be determined in accordance with ASTM 1424. Preferably, the tear strength is at least about 120 grams force. The burst strength of the laminate can be determined using a Mullen burst tester, according to ASTM D774/D774M-97. Preferably, the burst strength is at least about 170 kPa (25 psi).

In some particularly efficient embodiments, the protection sheet consists essentially of the fibrous material 16, the resin backing 18, and the fastening strips 26. By 'consisting essentially' we do not mean to exclude applied graphics and other materials that do not significantly affect the mechanical properties or function of the sheet material. In some examples the entire sheet is formed of at least 85 percent of a single resin, such as polypropylene, for recyclability. For example, each of the fibrous material, resin backing and male touch fastener elements may comprise at least 85 percent polypropylene. Twenty percent $CaCO_3$ may be added to the polypropylene of the fastener elements to provide enhanced stiffness. Alternatively, at least the fastening elements 30 may be formed of polyethylene, such as for use with very delicate carpet piles.

While the above example is described with respect to two fastener strips, in other cases additional fastener strips may be provided extending between the two spaced apart fastener strips. Preferably, however, a great lateral extent of the protection sheet remains free of fastener elements, such that the middle region of the sheet 'floats' on the underlying carpet and does not locally resist lateral deflection and billowing under foot traffic. Such billowing is believed to aid in the overall air permeability of the sheet as installed, with some air flow moving laterally through the fastening regions or along the sheet.

We have found that it is possible to provide a protection sheet, formed according to this disclosure, that has an overall basis weight, averaged across its width, of less than about 65 grams per square meter (1.9 osy), while maintaining a burst strength of at least about 170 kPa and a tear strength of at least about 120 grams force. This combination of properties has been found to be particularly cost-efficient and well-suited for the intended use of temporarily protecting carpet. The specific polypropylene example described above has an overall basis weight, averaged across its width, of about 54 grams per square meter (1.6 osy).

Figure 8:
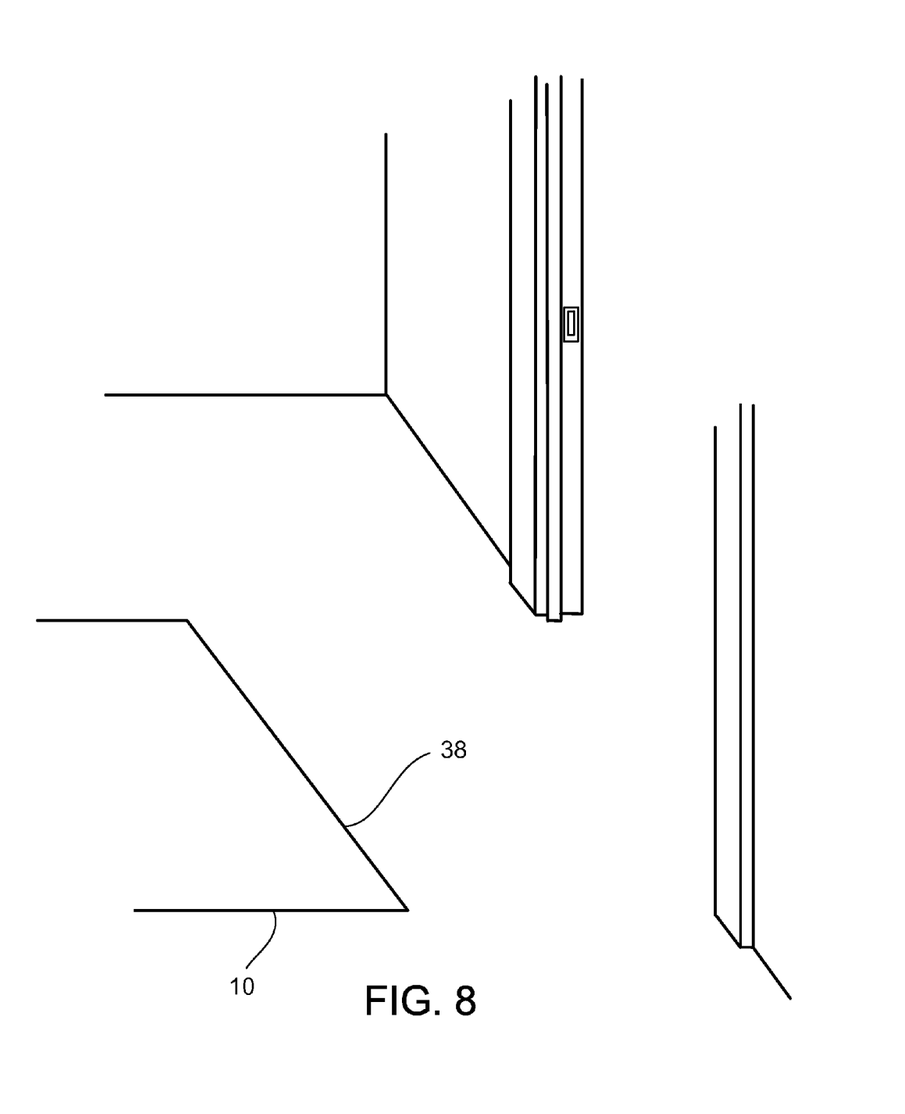
FIGS. 8-11 sequentially illustrate installation of protection sheet over a carpeted surface.
Figure 9:
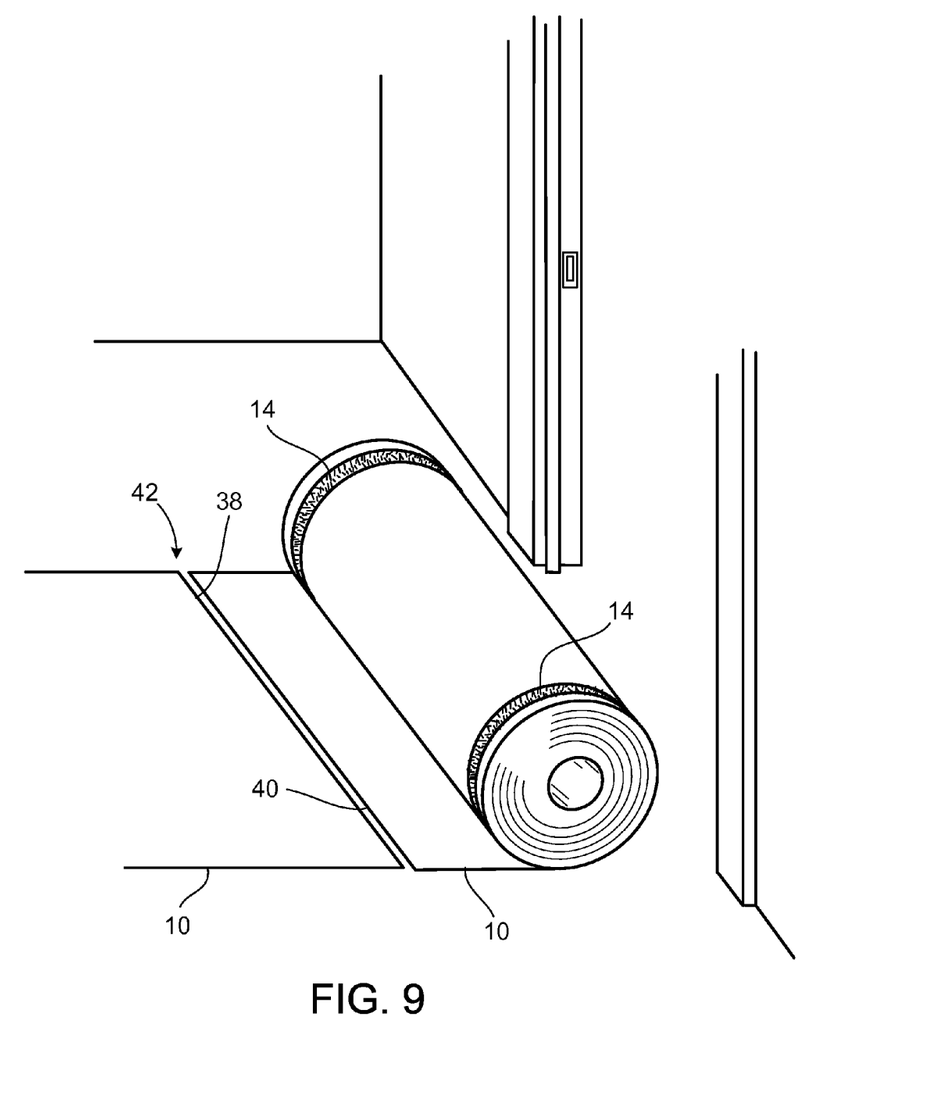
Figure 10:
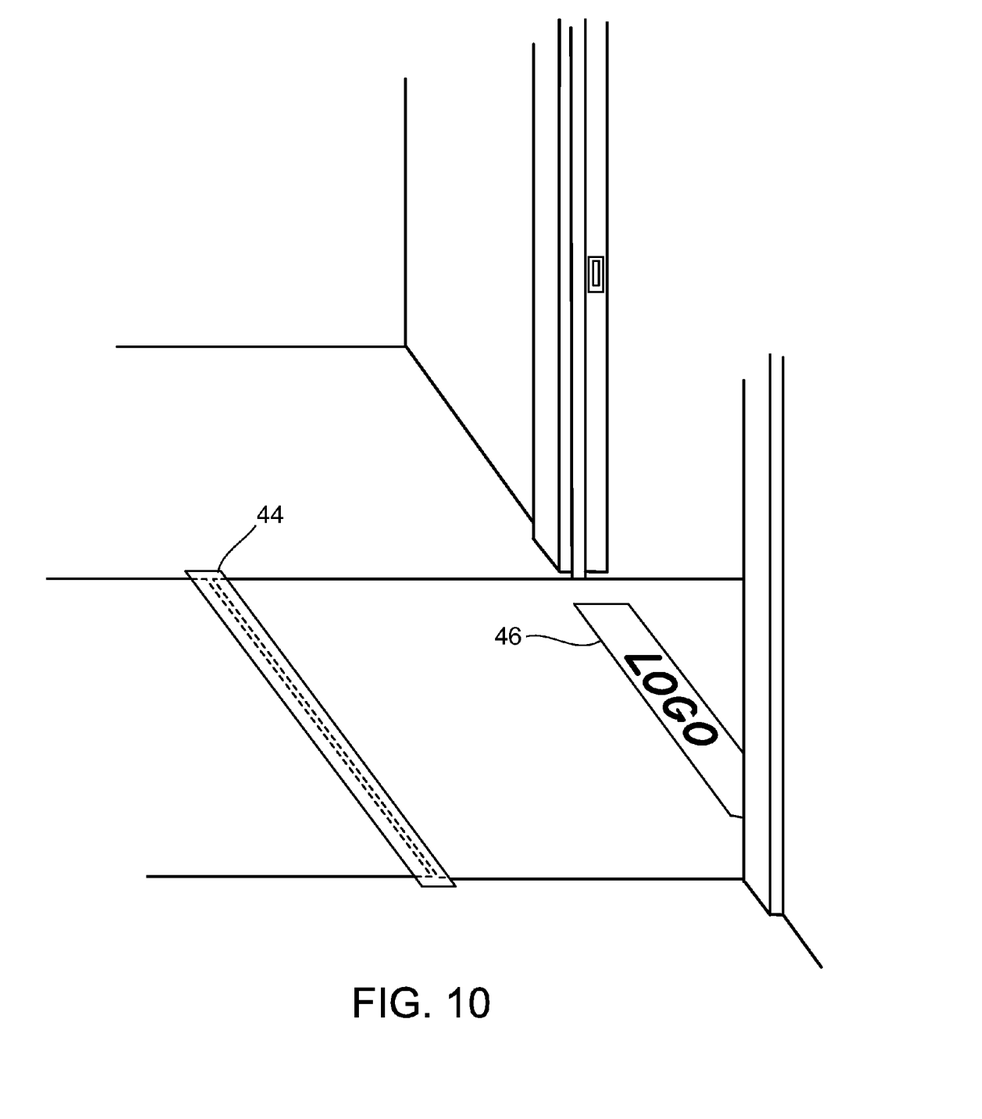

FIGS. 8-10 sequentially illustrate the installation of such carpet protection sheet in lengths placed end-to-end over a carpet. Beginning with FIG. 8, a first length of sheet 10 is unrolled, leaving an end 38. This end may be the end of the roll in which the sheet was supplied, or may be a cut end. By 'cut' we mean to include torn and severed. Next, a second length of sheet 10 is unrolled over the carpet as shown in FIG. 9, beginning with a longitudinal end 40 placed near end 38 of the first length of sheet. In some cases, a slight gap is left between the two ends, while in some other cases the two sheets slightly overlap lengthwise at the ends. In either case, the two ends together form an abutting seam 42. Next, a length of seaming tape 44 is placed over seam 42 to secure the adjacent longitudinal ends of the sheet, as shown in FIG. 10. Tape 44 has a width sufficient to cover any gap left between the ends. Tape 44 is a roll of molded hook tape, such as is available from Velcro USA as product HTH819. The molded fastener elements of that particular product are of the same design as the 97 Hook discussed above, such that they are configured to readily engage with the upper, fibrous surface of the protection sheet, as well as with the exposed carpet loop fibers in any gap between the sheet ends and at the ends of the seaming tape, which preferably is cut to extend laterally beyond both edges of the protection sheet. The width of the seaming tape could be, for example, about 50 millimeters.

FIG. 10 also illustrates that the upper, fibrous surface of the protection sheet 10 can be provided with suitable, preprinted graphics 46, such as representing a logo of a contractor, installation or use instructions, advertisement or decoration.

Figure 11:
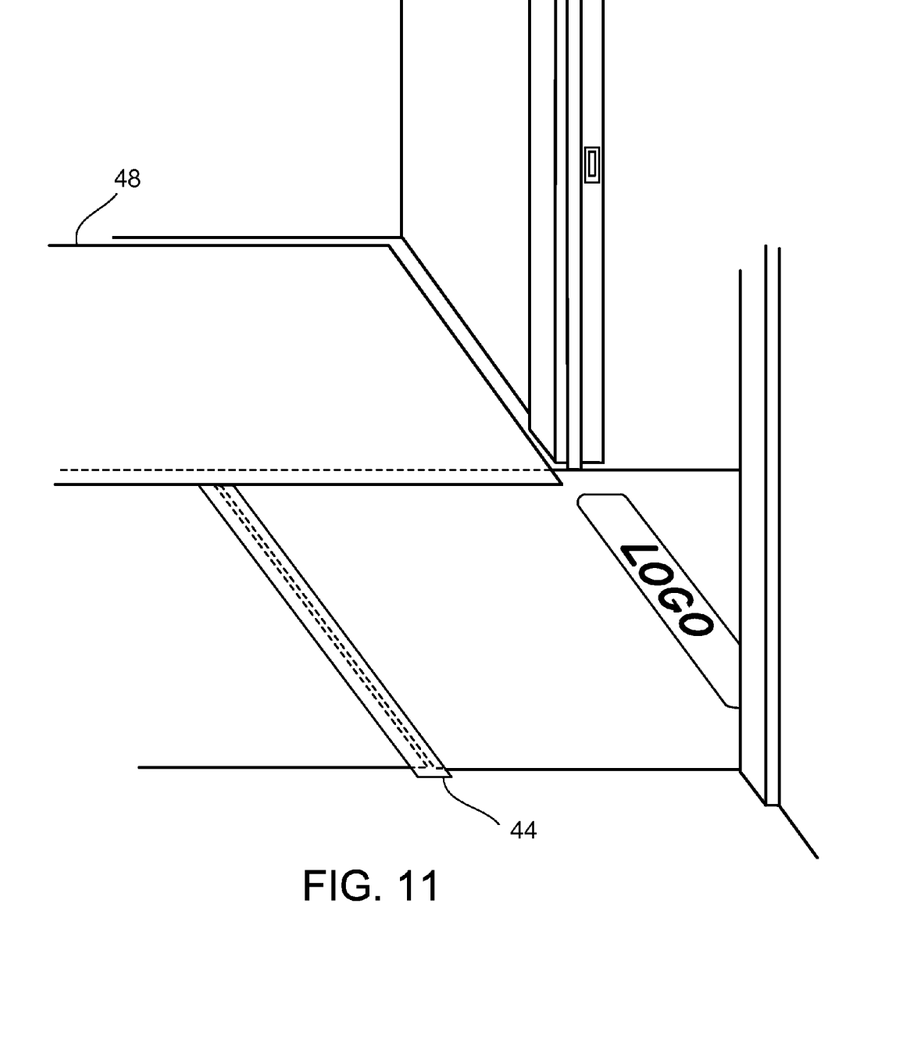
Figure 12:
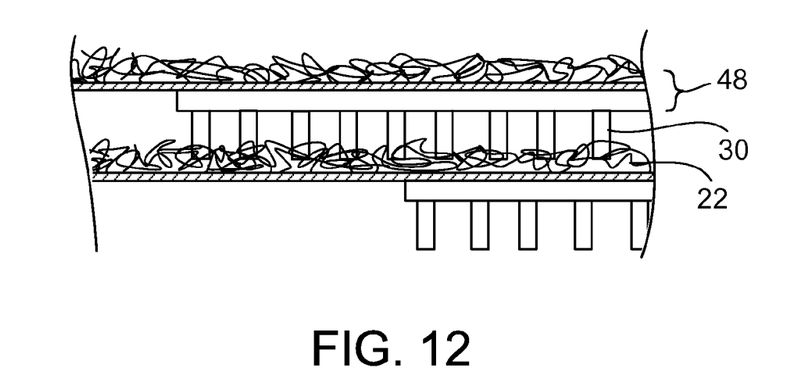
FIG. 12 is an enlarged, partial cross-sectional view, looking longitudinally at an overlapping portion of protection sheet.

Referring now to FIG. 11, if a broader area is to be covered, a second course 48 of protection sheet 10 can be overlapped along its longitudinal edge with a first, installed course of sheet 10. The amount of overlap is selected to cause fastener elements 30 of the fastening region of the second course near the overlapped edge to engage with fibers 22 the upper, fibrous surface of the first course, as shown in FIG. 12.

Figure 13:
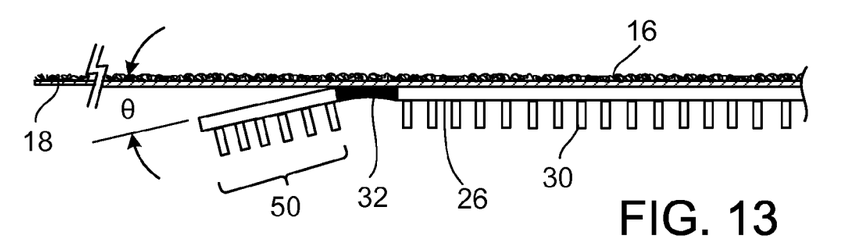
FIG. 13 is a partial cross-sectional view of an edge portion of protection sheet, showing displacement of an edge portion of a fastener strip.

FIG. 13 illustrates one advantageous effect of welding or otherwise bonding flexible fastening tape longitudinally to a flexible material, while leaving an edge region of the fastening tape detached. We have found that the process of joining the tape to the material can be conducted in a manner that causes the free edge of the tape to be deflected from its plane and extend slightly away from the flexible material. In this example, the flexible material is the laminate formed by fibrous material 16 and resin backing 18, and the strip is welded to the laminate as discussed above. However, it is envisioned that the advantages obtained by this effect may be useful in other applications. The deflection of the edge region 50, to extend at an angle θ from the nominal plane of the flexible material and fastener strip, causes the fastener elements 30 carried by the edge region to both be displaced farther from the flexible material for initially engaging a mating material (e.g., carpet or another hook-engageable surface), and to be angled from their vertical orientation, so as to present a slightly different posture to an approaching loop fiber. The amount of angular deflection of the edge region can be varied by changing the parameters and placement of the weld. For example, the angular deflection can be increased by shaping the sealing drum and weld head surfaces to provide a slight crease during welding. In one example, the free edge region has a width that carries about 25 rows of fastener elements, the fastener elements otherwise configured as discussed above. The angular deflection θ may be between about 2 and 12 degrees, for example.

Figure 14:
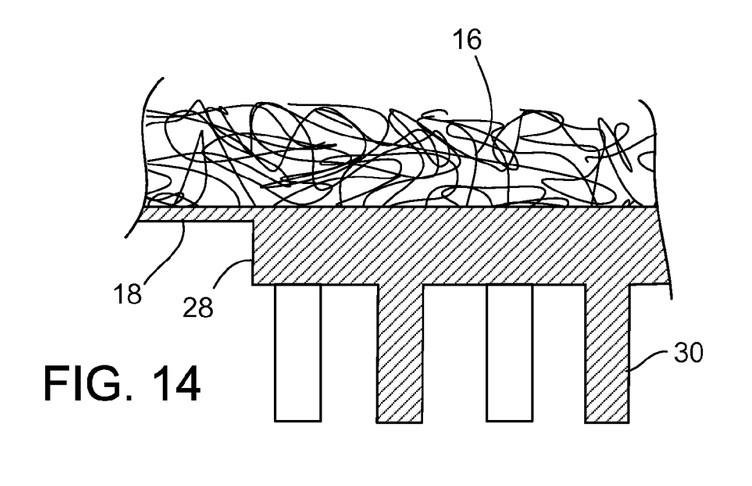
FIG. 14 is an enlarged partial cross-sectional view of a portion of protection sheet having a unitarily formed backing sheet and fastener strip.

In another example of a protection sheet, shown in FIG. 14, the male touch fastener elements 30, the base resin layers 28 and the resin backing 18 together form a unitary, seamless resin mass. This can be provided, for example, by forming the fastener elements, resin layers and resin backing from a single continuous flow of resin that is laminated to the fibrous material 16 as the fastener elements are formed. Methods for performing such lamination are taught, for example, in U.S. Pat. No. 5,260,015 to Kennedy et al., the entire contents of which are incorporated herein by reference.

Figure 15:
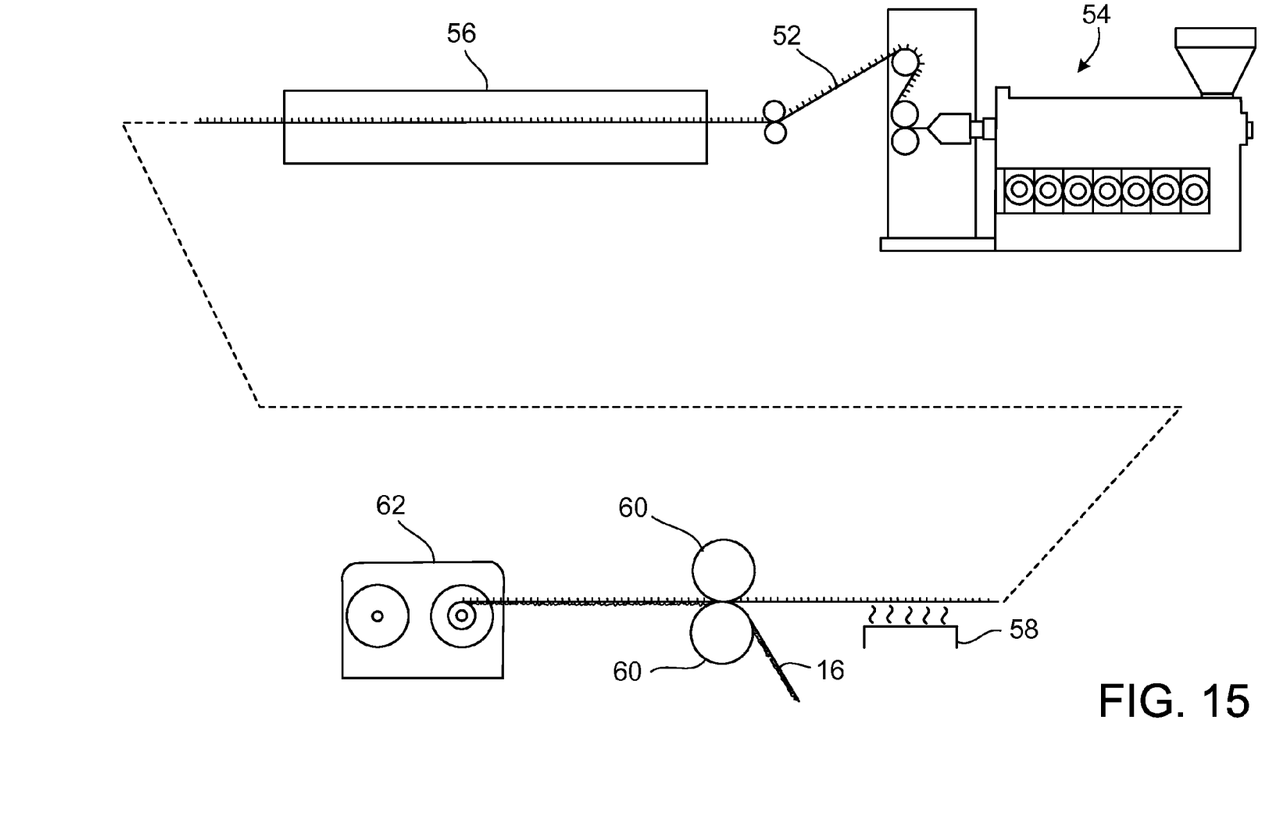
FIG. 15 illustrates a method of forming a stretched protection sheet laminate.

Another method of forming a protection sheet in the form of a fibrous material laminated to a unitary, seamless mass of resin forming both the backing and fastener elements is shown in FIG. 15. In this method, a perform resin fastener sheet 52 is formed from an extruded sheet of molten resin in a roll-molding station 54, such as is taught in U.S. Pat. No. 4,775,310 to Fischer, the entire contents of which are incorporated herein by reference. The molded sheet 52, having a molded nominal thickness of about 0.15 millimeters and two spaced-apart lanes of fastener elements, is directed to a tenter frame 56, which plastically stretches the sheet laterally while it is still warm, causing its width to increase substantially, such as from 0.5 meter to 2 or more meters in width, and causing its nominal thickness to decrease from about 0.15 millimeter to about 0.004 millimeter. The molded thickness in the lanes of fastener elements may be significantly more than the nominal molded thickness of the perform sheet, such that during stretching the vast majority of the plastic deformation occurs outside the fastening lanes, to reduce the effect of stretching on fastener element density within the lanes. Alternatively, the tenter frame may grip the molded sheet at or just inboard of the fastening lanes, to prevent stretching of the fastening lanes. The tenter frame may be configured to provide longitudinal, as well as lateral, stretching.

From the tenter frame 56 or other stretching means, the thinned fastener tape backing travels to a lamination station, in which the non-fastening surface of the tape is rapidly heated, such as by a flame or radiant heater 58, just prior to being laminated with fibrous material 16 between two calendering rolls 60, where the molten or softened non-fastening surface of the tape, now coextensive in width with the fibrous material, is fused with, or encapsulates, fibers of the fibrous material. From there the finished product is spooled at a spooling station 62.

Figure 16:
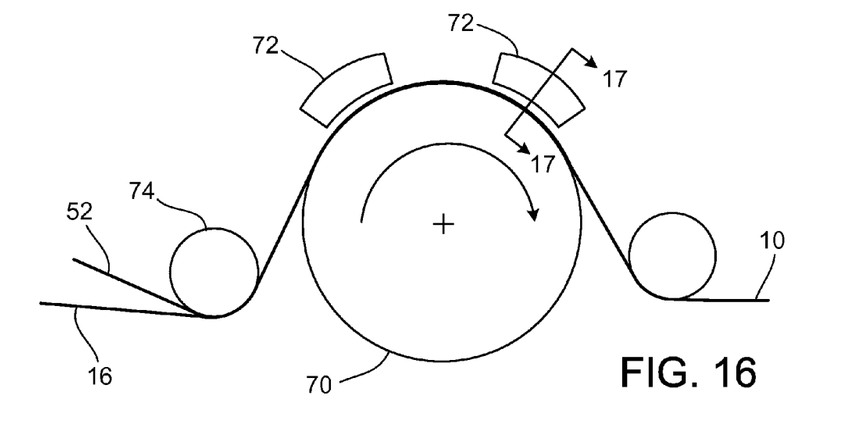
FIG. 16 illustrates an apparatus for laminating fastener strips to a substrate material.

FIG. 16 illustrates another apparatus and related method for performing a lamination of the fastener strips to the fibrous material, in particular so as to create longitudinally discontinuous weld zones along the finished laminate. A weld drum 70 is rotated with respect to weld shoes 72 that are mounted so as to apply a controlled pressure against the weld drum through the fibrous material 16 and fastener strips 52, which are brought together about an idler roll 74 directly upstream of weld drum 70.

Figure 17:
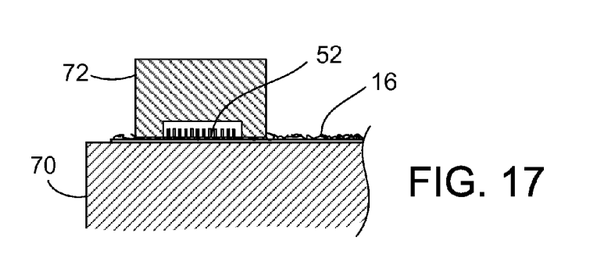
FIG. 17 is a partial cross-sectional view, taken along line 17-17 in FIG. 16.

Referring also to FIG. 17, the contacting surfaces of weld shoes 72 are profiled so as to contact the fastener strips only near their edges, with the central region of the weld shoe surface relieved to accommodate the fastener elements of the strip. Only one weld shoe is illustrated in this view, but it will be understood that another set of weld shoes is positioned to laminate the fastener strip running along the opposite edge of the fibrous material. The weld shoes 72 are maintained at a temperature sufficiently elevated to cause a bonding of the resin of the fastener strips to the fibrous material in the regions where extensive pressure is exerted through the fastener strips.

Figure 18:
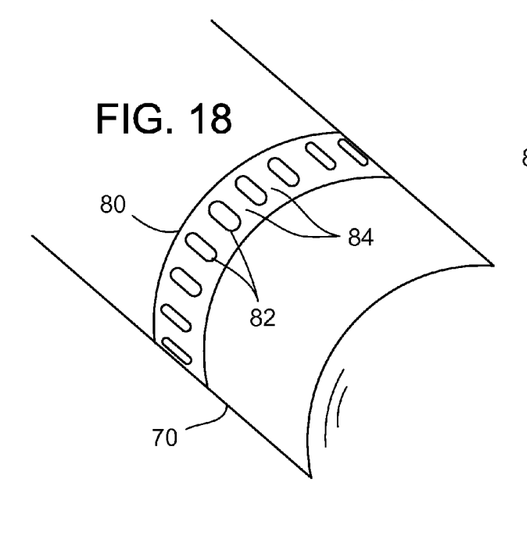
FIG. 18 is a partial perspective view of the welding drum of FIG. 16.

Referring to FIG. 18, the surface of the weld drum 70 may itself be provided with a pattern of raised and recessed areas, so as to limit the welding of the fastener strips to only those areas of the fastener strips both overlaying a raised area of the weld drum and underlying a raised portion of the contact surface of a weld shoe. In the illustrated pattern, a raised band 80 extends about the weld drum and defines a series of recesses 82 within the band. The recesses are equally spaced about the weld drum circumference and separated by lands 84 of the raised band. Band 80 is positioned along the axis of the weld drum so as to be aligned with one of the fastener strips. Although only one band is illustrated, another identical band is positioned near the other end of the weld drum, aligned with the other fastener strip.

Figure 19:
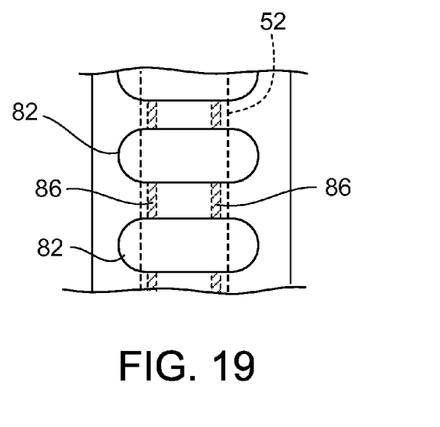
FIG. 19 shows a portion of an aperture tape applied around the weld drum.

Referring also to FIG. 19, band 80 is wider than the fastener strip to be bonded. In this view, the lateral edges of the fastener strip are shown in dashed outline. The recesses 82 have straight edges generally aligned with the axis of the weld drum. The resulting weld areas 86 are shown cross-hatched in this figure, illustrating that each fastener strip is welded to the fibrous material along two longitudinally discontinuous, or interrupted, weld lines. In the areas that overlay the weld drum recesses 82, no substantial bond is formed. The depth of recesses 82, relative to the lands 84 between the recesses, is in one instance only about 0.01 inch (0.25 mm).

The band 80 can be provided on weld drum 70 by wrapping a length of aperture tape about a cylindrical outer surface of the drum. For example, a heat resistant tape (e.g., of PTFE coated glass fiber, with an adhesive backing) of the desired thickness can be cut to form the desired pattern of apertures, and then adhesively bonded to the weld drum surface. A suitable tape is DXL-10S, available from Greenbelt Industries of Buffalo, N.Y. In one example, a 4-inch (100 mm) wide tape was die cut to form curve-ended apertures one inch (25 mm) wide and three inches (75 mm) long, spaced longitudinally along the tape so as to form a repeating pattern about the circumference of the weld drum. For example, the width of the lands between apertures was selected to be 0.7795 inch (19.8 mm) to form an even pitch spacing about a 12-inch (305 mm) diameter weld drum. When sufficiently worn, the tape can be readily replaced.

Although the overall weld area is reduced in comparison to a longitudinally continuous weld zone, discontinuous welding inhibits propagation of weld zone failures, such as due to a weakening of the materials caused by welding. While some types of weld failures may propagate along the length of the weld, such propagation may be interrupted by non-welded areas, resulting in a more reliable bond between the materials of the laminate.

While the above examples have focused on longitudinally continuous protection sheets, such as may be supplied in roll form, other examples of protection sheet are envisioned. For example, such sheet may be provided as a single piece of limited extent, such as in flat and/or folded form. Such a limited extent product may have fastening regions adjacent only two parallel edges, or essentially around its entire perimeter. Such a product may be employed to temporarily protect a carpeted or an upholstered surface, such as a floor beneath a child's eating area, or a vehicle seat or floor (such as during vehicle repair).

While a number of examples have been described for illustration purposes, the foregoing description is not intended to limit the scope of the invention, which is defined by the scope of the appended claims. There are and will be other examples and modifications within the scope of the following claims.

What is claimed is:
1. A temporary carpet protection sheet comprising:
a lightweight non-woven or knit fibrous material having longitudinal edges spaced apart to define a width of at least 0.5 meter, and an exposed broad surface featuring hook-engageable fibers;

a resin backing into which at least portions of fibers of the fibrous material are embedded, or to which resin of the fibers is directly and chemically fused, on a surface of the fibrous material opposite the exposed broad surface; and male touch fastener elements extending along the backing and arranged in spaced apart fastening regions adjacent the longitudinal edges of the fibrous material;

wherein the male touch fastener elements are configured to be both releasably engageable with the hook-engageable fibers of the fibrous material, when the protection sheet is arranged in overlapping fashion, and releasably engageable with looped carpet tufts.

2. The temporary carpet protection sheet of claim 1, wherein the protection sheet is free of adhesives, the resin backing bonded directly to the fibrous material and the male touch fastener elements of each fastening region extending from a unitary, molded base resin layer bonded directly to the resin backing.

3. The temporary carpet protection sheet of claim 1, wherein the male touch fastener elements of each fastening region form, together with the base resin layer of the region, a unitary, seamless resin mass, 4. The temporary carpet protection sheet of claim 3, wherein the male touch fastener elements, the base resin layers and the resin backing together form a unitary, seamless resin mass.

5. The temporary carpet protection sheet of claim 2, wherein each base resin layer is welded to the resin backing.

6. The temporary carpet protection sheet of claim 5, wherein each base resin layer is welded to the resin backing, only in weld areas spaced-apart across the base resin layer.

7. The temporary carpet protection sheet of claim 6, wherein the weld areas of each base resin layer are spaced from adjacent longitudinal edges of the base resin layer, such that the longitudinal edges of the base resin layer remain detached from the resin backing layer.

8. The temporary carpet protection sheet of claim 5, wherein the weld areas of each base resin layer are longitudinally discontinuous along the base resin layer.

9. The temporary carpet protection sheet of claim 2, wherein the protection sheet consists essentially of the fibrous material, the resin backing, the male touch fastener elements and the base resin layers.

10. The temporary carpet protection sheet of claim 1, wherein the fibrous material, resin backing and male touch fastener elements each comprise at least 85 percent polypropylene.

11. The temporary carpet protection sheet of claim 1, wherein the carpet protection sheet has an overall basis weight, averaged across its width, of less than about 65 grams per square meter (1.9 osy).

12. The temporary carpet protection sheet of claim 1, wherein the male touch fastener elements are configured to provide an initial Carpet Peel force of less than about 9.0 grams per lineal millimeter of fastening region width.

13. The temporary carpet protection sheet of claim 12, wherein the male touch fastener elements are configured to provide an initial Carpet Peel force of between about 1.8 and 9 grams per lineal millimeter of fastening region width.

14. The temporary carpet protection sheet of claim 1, wherein the fibrous material comprises a spun-bond nonwoven material.

15. The temporary carpet protection sheet of claim 1, wherein the fibrous material has a basis weight of less than about 33 grams per square meter (1.0 osy).

16. The temporary carpet protection sheet of claim 1, wherein each fastening region has a width less than about five percent of the width of the fibrous material.

17. The temporary carpet protection sheet of claim 1, wherein each fastening region is spaced from an adjacent longitudinal edge of the fibrous material by a distance between about 5 and 10 millimeters.

18. The temporary carpet protection sheet of claim 1, wherein the resin backing defines micro-holes providing air permeability through the protector sheet.

19. The temporary carpet protection sheet of claim 18, wherein the micro-holes define an average hole area of less than about 0.005 square millimeters.

20. The temporary carpet protection sheet of claim 1 spooled into a roll, with the male touch fastener elements facing outward and releasably engaging the fibrous material of an overlying portion of the protection sheet.

21. The temporary carpet protection sheet of claim 1, wherein the fibrous material includes at least portions of a graphic visible from the exposed broad surface.

22. The temporary carpet protection sheet of claim 1, wherein the protection sheet has a burst strength of at least about 170 kPa (25 psi).

23. The temporary carnet protection sheet of claim 1, wherein the protection sheet has a tear strength of at least about 120 grams force.

24. A temporary carpet protection system comprising:
   the temporary carpet protection sheet of claim 1, in discrete lengths placed end-to-end over a length of carpet; and
   strips of seaming tape each extending across adjacent ends of the discrete lengths of protection sheet, the seaming tape consisting essentially of a length of molded hook tape having a continuous resin base from which an array of molded male touch fastener elements extend;
   wherein the male touch fastener elements of the seaming tape engage underlying portions of the ends of the discrete lengths of protection sheet, to cover and retain the ends in place over the carpet.

25. The temporary carpet protection system of claim 24, wherein the male touch fastener elements of the seaming tape are of identical shape and size in comparison with the male touch fastener elements of the protection sheet.

26. The temporary carpet protection system of claim 24, further comprising:
   a further length of the temporary carpet protection sheet of claim 1, placed in lateral overlapping relation to one of the discrete lengths of temporary carpet protection sheet;
   wherein the male touch fastener elements of the further length of temporary carpet protection sheet overlie and releasably engage the fibrous material of the overlapped discrete length of temporary carpet protection sheet.

27. A method of temporarily covering an area of installed carpet, the method comprising:
   providing the temporary carpet protection sheet of claim 1; and
   placing the temporary carpet protection sheet over the area of installed carpet to be covered, such that the male touch fastener elements of the temporary carpet protection sheet attach to the installed carpet as the temporary carpet protection sheet is placed, thereby removably covering the area of installed carpet.

* * * * *

UNITED STATES PATENT AND TRADEMARK OFFICE
CERTIFICATE OF CORRECTION

PATENT NO.       : 8,048,507 B2
APPLICATION NO.  : 13/016513
DATED            : November 1, 2011
INVENTOR(S)      : David Blaire Townsend It is certified that error appears in the above-identified patent and that said Letters Patent is hereby corrected as shown below:

Column 11, line 22, Claim 3: delete "mass," and insert -- mass. --;

Column 11, line 29, Claim 6: delete "backing," and insert -- backing --;

Column 12, line 24, Claim 23: delete "carnet" and insert -- carpet --.

Signed and Sealed this
Thirty-first Day of January, 2012

David J. Kappos
*Director of the United States Patent and Trademark Office*